(12) United States Patent
Curet et al.

(10) Patent No.: US 6,920,178 B1
(45) Date of Patent: Jul. 19, 2005

(54) METHOD SWITCHING THE VIDEO COMPONENT(S) OF A FIRST DIGITAL, AUDIO-VISUAL PROGRAM ONTO THE VIDEO COMPONENTS OF A SECOND AUDIO-VISUAL DIGITAL, VIDEO-AUDIO PROGRAM TO COMPENSATE THEIR PHASE-SHIFT

(75) Inventors: Dominique Curet, Thorigne Fouillard (FR); Michel Veillard, Bruz (FR); Germain Lolivier, Rennes (FR); Therese Garault, Saint-Jacques de la Lande (FR); Gerard Hellegouarch, Cesson-Sevigne (FR); Andre Douteau, Chavagne (FR); Stephanie Relier, Rennes (FR); Gerard Madec, Chasne-sur-Ilet (FR)

(73) Assignees: France Telecom SA, Paris (FR); Telediffusion de France SA, Paris (FR)

(*) Notice: Subject to any disclaimer, the term of this patent is extended or adjusted under 35 U.S.C. 154(b) by 0 days.

(21) Appl. No.: 09/807,620

(22) PCT Filed: Oct. 12, 1999

(86) PCT No.: PCT/FR99/02469

§ 371 (c)(1),
(2), (4) Date: Jul. 16, 2001

(87) PCT Pub. No.: WO00/22835

PCT Pub. Date: Apr. 20, 2000

(30) Foreign Application Priority Data

Oct. 14, 1998 (FR) ............................................ 98 12973

(51) Int. Cl.[7] .............................................. H04N 7/24
(52) U.S. Cl. ................................................ 375/240.14
(58) Field of Search ..................... 375/240.14, 240.25, 375/240.28; 348/845, 845.3, 705, 423.1; H04N 7/24

(56) References Cited

U.S. PATENT DOCUMENTS

| | | | | | |
|---|---|---|---|---|---|
| 6,038,000 | A | * | 3/2000 | Hurst, Jr. | ............... 375/240.26 |
| 6,137,834 | A | * | 10/2000 | Wine et al. | ................ 375/240 |
| 6,408,029 | B1 | * | 6/2002 | McVeigh et al. | ...... 375/240.13 |
| 6,584,273 | B1 | * | 6/2003 | Ashley et al. | ................ 386/52 |
| 6,678,332 | B1 | * | 1/2004 | Gardere et al. | ........ 375/240.26 |

FOREIGN PATENT DOCUMENTS

WO   98 32281 A   7/1998

OTHER PUBLICATIONS

J. Mitchell; "MPEG video compression standard"; 1996, Chapmann & Hall XP002098501, p. 355, paragraph 3.

Weiss S M; "Switching Facilities in MPEG–2: Necessary but not sufficient"SMPTE Journal, vol. 104, No. 2; Dec. 1, 1995; pp. 788–802, XP000543847 figure 9.

* cited by examiner

*Primary Examiner*—Nhon Diep
(74) *Attorney, Agent, or Firm*—Lowe, Hauptman & Berner, LLP

(57) ABSTRACT

The video component(s) of a digital audio-visual first program are switched onto the video components of a second digital, audio-visual program by (1) switching onto the video component of the second program, subsequent to the switch command and to the end of a picture of the first program, and (2) replacing, as seen in the order of transmission, each non Intra picture of the component of a second program, with a picture having coding performed independently of (a) the picture data of the replaced picture and (b) of the contents of the pictures to which it refers until the beginning of the next Intra picture of the component of the second program.

17 Claims, 9 Drawing Sheets

Figure 1:
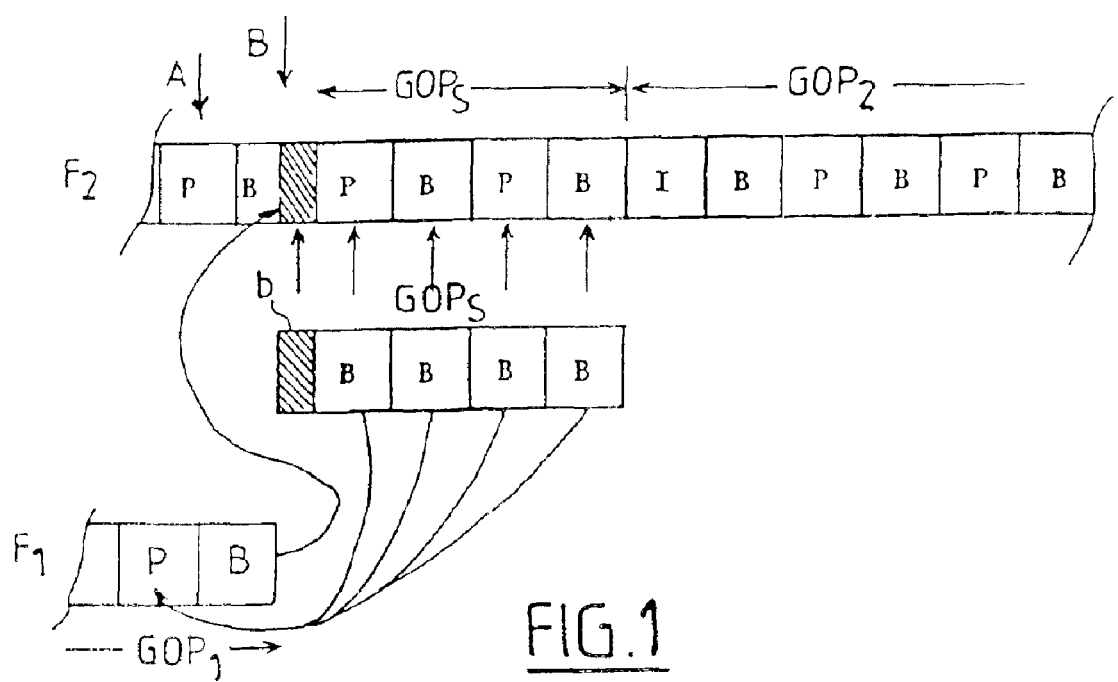

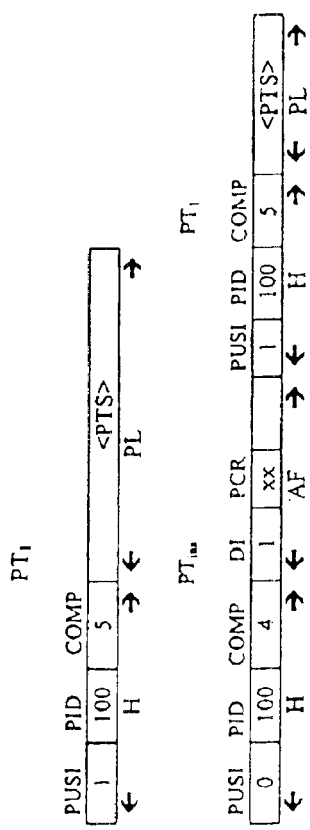
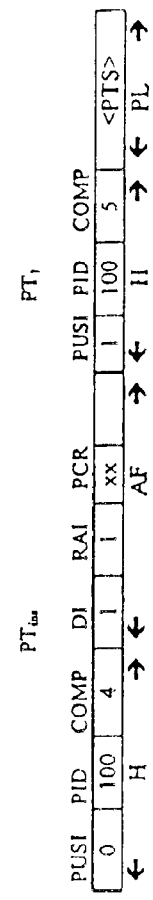
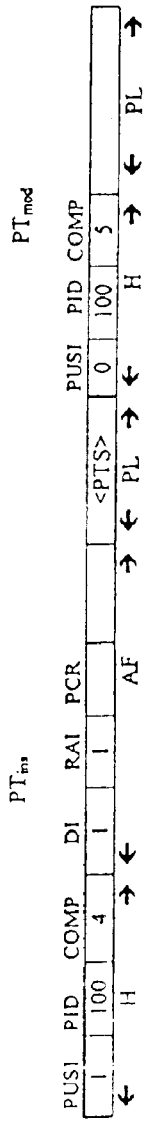
Fig. 10a
Fig. 10b
Fig. 10c

METHOD SWITCHING THE VIDEO COMPONENT(S) OF A FIRST DIGITAL, AUDIO-VISUAL PROGRAM ONTO THE VIDEO COMPONENTS OF A SECOND AUDIO-VISUAL DIGITAL, VIDEO-AUDIO PROGRAM TO COMPENSATE THEIR PHASE-SHIFT

The present invention relates to a method switching the video component(s) of a first digital, audio-visual program onto the video component(s) of a second digital, audio-visual program.

The invention applies to the field of digital, audio-visual services wherein digital programs consist of at least one video component and may comprise several video components, none or several audio components, and none or several data components. The invention only considers the case of video components.

Pertinent digital audio-visual services include those using the so-called MPEG-2 standard (Moving Pictures Expert Group) ISO/IEC JTC1 IS 13818. This standard is described in several documents each corresponding to a distinct portion (video, audio, system, conformity etc.)

Nevertheless it is to be understood that the present invention is not restricted to solely following this particular MPEG-2 standard but also covers any digital, audio-visual service application.

The audio and video portions of the MPEG-2 standard described how to digitally code the audio and video data. The system portion of the MPEG-2 standard specifies that resultant compressed elementary streams are configured as elementary stream packets termed packetized elementary streams (PES) packets containing video data. These PES packets may be of fixed or variable size.

In non restrictive manner the description below discusses the use of variable-size, video PES packets, each PES packet containing a single picture and where called for sequence headers or headers of group of pictures GOP, the pictures being aligned at the beginning of the PES packet. The PES packets moving the same elementary stream are identified by a stream identifier called the stream Id.

The system MPEG-2 standard indicates that the PES packets (video, audio or data) may be multiplexed for local use for instance with signalization PES packets. Such a multiplex may be stored in the kind of disks known as DVD (digital versatile disk) for instance if a program MPEG-2 syntax is involved.

According to the system MPEG-2 standard, the elementary stream configured as PES packets next may be cut into fixed-size packets called transport packets (TP). Such a fixed-size packet is identified by a packet identifier (PID). A stream of PES packets having the same stream ID can only be moved in transport packets having the same packet identifier PID. The transport packets moving a particular elementary stream (and the PES packets having divided this elementary stream a first time) can be multiplexed with other transport packets TP moving other elementary streams, and furthermore also including transport packets TP containing the signalization. These multiplexes of transport packets TP then are available for transmission: it involves the transport MPEG-2 syntax.

The system portion of MPEG-2 therefore relates to two syntaxes, the MPEG-2 program syntax and the MPEG-2 transport syntax. The MPEG-2 system syntax is generic in the sense that these two syntaxes can be converted one into the other and in that they apply to two very different applications: storing an MPEG-2 program and transmitting one or more MPEG-2 transport programs. One of the applications of the invention relates to these to syntaxes.

The video portion of the video MPEG-2 standard relates to three kinds of pictures:

the so-called I pictures (intra coded) that do not refer to any other picture; these are the pictures with a moderate compression ratio; their coding does not entail using procedures of motion estimates, the P pictures (predictive coded pictures) which are coded pictures using prediction procedures estimating motion based on a preceding picture which may be a type I or a type P picture, the B pictures (bidirectional predictive-coded pictures) which are coded using prediction procedures of motion estimates based on a preceding picture (as regards display, it is called forward prediction) and/or a future picture (as regards display, this is a back prediction) which are of the I or P type.

The video MPEG-2 standard sets up six hierarchy levels for the syntax of an elementary video stream: the sequence, the group of pictures GOP which is the only optional level, the picture (type I, P or B), the picture slice, the macroblock and the block.

A video sequence begins with a sequence header which is followed by one or more sets of pictures. According to the MPEG-2 standard, these sets of pictures may be configured in (optional) groups of pictures GOP. A group of pictures GOP is characterized by a header of group of pictures GOP situated before the pictures. In the order of transmission, a group of pictures GOP begins with a (mandatory) I picture followed in a rigorous order by a certain number of bidirectional B pictures and predictive P pictures.

The conventional size of the group of pictures GOP being 12 pictures, the program video component consists of strings of sequences at one group of pictures GOP per sequence. In loose manner hereafter, a group of pictures GOP shall be called a sequence header followed by a 12-picture group of pictures GOP or by several smaller groups of pictures GOP.

The pictures comprise a header and data consisting of a certain number of slices. One slice reconfigures several continuous macroblocks in the picture. In conventional (4:2;0 format) digital television, a macroblock is the combination of four luminance blocks, one block with a first chrominance component for the same pixels and one block of a second chrominance component also for the same pixels. One block contains the data of eight by eight squares of pixels.

The illustrative application of the invention described further below remains within the scope of the MPEG-2 transport standard. This implementation relates to chaining different television programs. A first program selected from a given number of programs of a first multiplex is to be switched onto a second program selected from a given number of programs from a second multiplex and, as called for later, to switch again the second program onto the first one.

These operations involve two same-syntax multiplexes (for instance MPEG-2 transport syntax or MPEG-2 program syntax) which are coded in real time or are retrieved from a storage system. The illustrative implementation of the invention described further below relates to the transport MPEG-2 but operations carried out at the elementary level and at the level of the PES packets are directly applicable to the program MPEG-2 standard.

In particular reference is made to the patent document WO 98 32 281 A which describes a switching method based on compressed digital stream data such as the MPEG transport streams. In particular the streams implemented in the invention described in said patent document are fitted with at least one stream entry point and at least one exit point identifying an appropriate exit point of this stream. Accordingly a main stream is switched at its output point onto the entry point of another stream. Furthermore an exit point of a video stream in general is the end of the last video transport packet of the stream. As regards the entry point, it is generally the beginning of the first transport packet of the stream under consideration. A stream between an entry point and an exit point is called a segment of which the first picture is a fixed picture and the second picture does not refer to a picture before the entry point. Also, the last segment picture in the order of presentation cannot be a B picture.

It is understood in the light of the above that by appropriately selecting the input and output points, a main stream can be switched onto a segment and that this switching is carried out without a visible defect appearing in the presented picture.

Nevertheless, as already cited in the above cited patent document, commercial television may deliberately generate streams lacking exit points, so that switching based on these streams must entail defects. Also someone using such a system must be able to control the source of the stream to which the switching is applied in order to meet the above constraints: entry point, first and second pictures, last picture. The applications cited in the above patent document are all carried out in a studio which therefore controls the stream which shall be switched. In some applications, however, for instance at the head of a radio station, such may not be the case because the two sources are part of the television production channels.

Moreover there are few manufacturers of the MPEG-2 coders who offer means implementing these entry and exit points.

This kind of application raises a major problem in that the video components being switched one onto the other will not be necessarily synchronized. If not synchronized, they exhibit a phase difference due to processes taking place at different levels:

- still at the elementary video level: the video scenes compressed by each video coder may exhibit different structures (picture sizes, structures of the groups of pictures, etc.),
- regarding the PES packets: the packaging mode of the compressed pictures in the PES packets may differ from one component to the next,
- as regards the transport packets TP: the advance or delay caused by the jitter of the transport packets within which the PES packets are being moved.

Within the scope of the present invention, the phase differences at the elementary level assume foremost importance. As regards the PES packets, it will suffice to handle the case of one PES packet containing a single picture. On the other hand the jitter of the transport packets is ignored.

Given the phase shift of the video coders, the end of a sequence or of a group of pictures GOP of the first program may be located anywhere in the video of the second program, for instance in the progress of an arbitrary picture. Therefore the next beginning picture may be a bidirectional B picture or a predictive P picture which refer to other pictures of the second program preceding switching and which were not transmitted because at that time the transmission did apply to the first program pictures. The result is improper decoding and defects in the displayed pictures that may last more or less depending on the magnitude of the phase difference between the two video components.

In order to compensate this phase difference, one simple solution would be to delay the second program, entailing a storage having the capacity of a group of pictures GOP for each second-program video component. However this solution entails applying a permanent delay to the second program. Also this solution will be difficult to apply if the second program is scrambled.

Therefore the objective of the present invention is to propose a method allowing solving the above cited phase difference problem and precluding delaying the second program.

For that purpose a method of the invention switching the video components of a first digital, audio-visual program onto the video components of a second, digital audio-visual program is characterized in that the switching takes place after the command to switch onto the second-program video component and after the end of a picture of the first program and in replacing, in the order of transmission, each picture other than an intra picture of said component of said second program with a picture which is coded independently of the picture data of the replaced picture and of the contents of the pictures to which it refers until the beginning of the next Intra picture of said component of the said second program.

In another feature of the invention, its method consists in replacing the data present in the second-program video component between the time when the end of a picture of the first-program video component has been encountered after having received the switch command and the beginning of the first picture of the second program with stuffing data.

In another feature of the invention, the time references of each replacement picture are updated.

I another feature of the invention, the data relating to the expected minimum delay before it is feasible to decode a picture (Vbv delay) is retrieved from th e replaced picture and positioned in each corresponding replacement picture unless it be different from 'FFFF in the other pictures of said component of said second program and in this case assuming the value 'FFFF.

In a first implementation variation of the method of the invention, the replacement pictures constitute a sequence of bidirectional B pictures all referring to the last predictive picture P of the first-program video component, the motion estimating vectors of each bidirectional substitution picture B being set to a zero value. Said replacement pictures B for instance are interleaved pictures comprising a BOTTOM frame and a TOP frame which as a result are similar to digital television pictures and their predictions are field-based predictions. In this case the TOP frames and the BOTTOM frames of said B replacement pictures refer to the sole BOTTOM frame of the last predictive P picture of the first-program video component.

In a second variation of implementation of the method of the invention, the replacement pictures constitute a sequence of pictures which, in the order of transmission, are a predictive picture followed by one or more bidirectional pictures, the predictive replacement picture P referring to the last predictive picture P of the first-program video component and each of the bidirectional B pictures referring to said predictive replacement picture P, the motion estimating vectors of each of the substitution pictures being set to a zero value.

In another mode of implementing the method of the present invention, the replacement pictures constitute a sequence of pictures which, in the order of transmission, consists alternating predictive and bidirectional pictures, the first predictive replacement picture referring to the last predictive picture P or I picture of the first-program video component, then each following replacement predictive picture P referring to the predictive P picture preceding it, and each bidirectional replacement picture B only referring to the predictive P picture which precedes it, the number of bidirectional B pictures between two predictive P pictures being equal to the number encountered in the first-program video component, and motion estimating vectors of each of the replacement pictures being set to a zero value.

In either of the above cases, said replacement pictures are frame pictures comprising a TOP frame and a BOTTOM frame which as a result are similar to digital television pictures and their predictions are field-based predictions. Therefore the TOP and BOTTOM frames of the first predictive replacement picture P refer to the sole BOTTOM frame of the last predictive picture P or I of the first-program video component, and the TOP and BOTTOM frames of the predicted P or bidirectional B pictures which follow refer to the BOTTOM frame of the first predictive replacement picture P.

In another implementing mode of the method of the present invention, the replacement pictures constitute a sequence of pictures which, in the order of transmission, consists of a first picture which is an Intra picture, the other pictures being alternating bidirectional and predictive pictures, the first predictive replacement picture P referring to the Intra picture, then each following predictive replacement picture P referring to the predictive picture P which precedes it, and each bidirectional replacement picture B only referring to the predictive picture P or Intra picture which precedes it, the number of bidirectional pictures B between two predictive pictures P being equal to that encountered in the first-program video component, and the motion estimating vectors of each of the replacement pictures being set to a zero value except for the Intra picture which is without a motion estimating vector. Said replacement pictures are frame pictures which may comprise a TOP frame and a BOTTOM frame which as a result are pictures similar to those of digital television and the predictions of the bidirectional pictures B and the predictive pictures P are field-based predictions. The TOP and the BOTTOM frames of the replacement pictures B or P which follow the picture I then refer to the BOTTOM frame of the replacement picture I or P which precedes it.

The method of the present invention can be implemented in a transmission system wherein said pictures each constituting video components of the first and second programs are transported by transport packet streams, each transport packet TP being fitted with a PUSI (payload unit start indicator) indicator which, when set at 1, denotes that said packet contains the beginning of a PES (packetized elementary stream) packet, the PES packets being aligned with the beginning of payload of the transport packets TP, each PES packet containing a single picture, said transport system being such that certain transport packets are made to carry transport data such as a random access indicator (RAI) which, when set at 1, denotes that the next transport packet moving this component shall contain the first data of a video sequence. In this case said system consists in the following:

determining the first transport packet TP of the first-program video component which is present after the switch command and which comprises a random access indicator RAI set at 1 in order to determine the time of switching at the second program, switching onto said second-program video component and replacing the transport packets TP of this video component with stuffing transport packets until the appearance of the following transport packet TP of which the PUSI indicator is set at 1, in this transport packet TP, of which the PUSI indicator is set at 1, and provided the RAI indicator is NOT set, replacing the PES packet header situated at the beginning of the payload by a reconstructed PES packet header, starting with this transport packet and after the PES packet header, replacing the payload data of each transport packet of this component with the replacement picture data and when all data of the replacement picture have been inserted into the video component transport packet payloads, replacing the payload data of following transport packets TP of the component with video stuffing such as '00 octets until the appearance of the next transport packet of this second-program video component of which the PUSI indicator is set at 1, this transport packet TP excluded, then restarting the preceding stage from this transport packet TP with the PUSI indicator set at 1 until the appearance of the next transport packet of the second-program video component of which the random access indicator RAI is set at 1, this transport packet excluded, setting the discontinuity indicator DI at 1 on this packet with the random access indicator RAI which corresponds to the end of replacement and to the actual beginning of the second program video.

Advantageously, if the transport packets TP are scrambled, said method consists in denoting them in clear by setting the transport scrambling control TSC field at the binary value 00.

Said method can be implemented in a transmission system wherein said pictures each constituting video components of the first and second programs are transported by transport packet streams, each transport packet TP comprising a PUSI indicator which, when set at 1, denotes that said packet contains the beginning of a PES packet, these PES packets being aligned with the beginning of the payload of the transport packets TP, each PES packet containing a single picture, said transmission system consisting in he following: certain transport packets are intended to carry transport data such as a random access indicator RAI which, when set at 1, denotes that the next transport packet moving this component contains the first data of a video sequence, said method then consisting in:

determining the first transport packet of the first-program video component which is present after the switch command and which comprises a random access indicator RAI set at 1 to determine the switching time onto the second program, switching onto said second-program video component and replacing the transport packets TP of this video component with stuffing transport packets until the appearance of the following transport packet TP of which the PUSI indicator is set at 1, if the RAI indicator is set and starting with this transport packet and after the PES header, replacing the payload data of each transport packet of this component with replacement image data and when all replacement image data have been inserted in the payload of the video component transport packets TP, replacing the payload data of the following transport packets TP of the component with video stuffing such as '00 octets until the appearance of the next transport packet of this second-program video component of which the PUSI indicator is set at 1, this TP transport packet excluded, then beginning again with the previous stage based on this transport packet TP with the PUSI indicator set at 1 until the appearance of the next transport packet TP of the second-program video component of which the random access indicator RAI is set at 1, this transport packet excluded, setting the discontinuity indicator DI at 1 on this packet with random access indicator RAI which corresponds to the end of replacement and to the actual beginning of the second program video.

In case neither of the video components is fitted with a random access indicator RAI set in the transport stream, said method of the invention moreover consists in:

determining the video component transport packet TP of the stream(s) without RAI indicator of which the PUSI indicator is set at 1 and of which the payload data begin with a video sequence header, carrying out a search for the sequence header after the switch command, setting the discontinuity index in the determined transport packet TP if latter comprises an adaptation field AF with a program clock reference PCR in the case of the component bearing the program clock, or if the determined transport packet TP does not comprise an adaptation field AF or if the component bearing the program clock is involved and the adaptation field AF does not comprise a PCR clock reference, replacing the determined transport packet TP with a specific transport packet TP called the inserted transport packet and shifting the replaced transport packet TP as well as the following transport packets of this video component in the transport stream until one of them can be inserted into a stuffing transport packet TP.

Advantageously the inserted transport packet TP exhibits the following advantages:

the PUSI indicator is set at 0, the status of the continuity counter COP is set at that of the continuity counter of the initial transport packet, less 1, the control field AFC of the adaptation field AF is set at the binary value 00 denoting that an adaptation field AF, but not a payload, is present in this transport packet TP, the discontinuity indicator DI situated in the adaptation field AF is set at 1, if the video component carries the program clock reference PCR, set a PCR clock calculated on the basis of the preceding PCR clocks of the same component in the adaptation field AF.

In case a presentation time stamp PTS is present in the header of the PES packet containing the sequence header, the method of the invention pre-processes the setting of the RAI indicator, said transport packet TP which was inserted to set the random access indicator then exhibiting the following features:

the PUSI indicator is set at 0, the status of the discontinuity counter COMP is set to that of the discontinuity counter of the initial transport packet TP less 1, the control field AFC of the adaptation field AF is set to the binary value 10 denoting thereby that an adaptation field is present in this transport packet TP, but not a payload, the RAI indicator situated in the adaptation field AF is set at 1, the discontinuity indicator DI situated in the adaptation field is set, if the video component carries the program clock, a program clock reference PCR calculated on the basis of the preceding clock references PCR of the same component is set in the adaptation field AF.

In case the presentation stamp is absent from the header of the PES packet containing the sequence header and if the initial transport packet is modified in a manner that its PUSI indicator is set at 0 and payload data are suppressed in the PES packet header, then said transport packet TP inserted to set the RAI indicator will exhibit the following characteristics:

the PUSI indicator is set at 1, the status of the continuity counter COMP is set at that of the continuity counter of the initial transport packet TP, less 1, the control field AFC of the adaptation field AF is set at the binary value 11, denoting that an adaptation field and a payload are present in this transport packet, the adaptation field AF comprises an RAI indicator set at 1, the discontinuity indicator is set at 1 on this packet with RAI indicator, a program clock reference PCR calculated on the basis of the preceding clock reference(s) PCR of the same component is set in the adaptation field AF if the video component bears the program clock, a presentation stamp PTS is calculated and positioned in this packet's payload, the PES packet header in the replaced transport packet TP is moved into the payload of this inserted transport packet TP and in case the presentation stamp PTS is absent from the PES packet header, said stamp PTS is calculated and positioned in the header data of this PES packet.

The above cited features of the invention as well as further ones are elucidated below in the following description of several implementing modes of the invention, said description relating to the attached drawings also.

Figure 2:
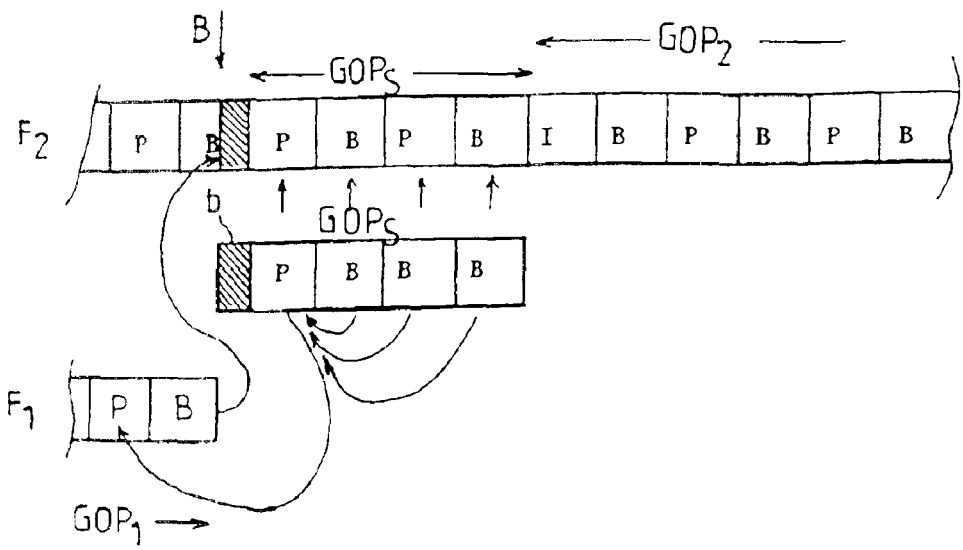
Figure 3:
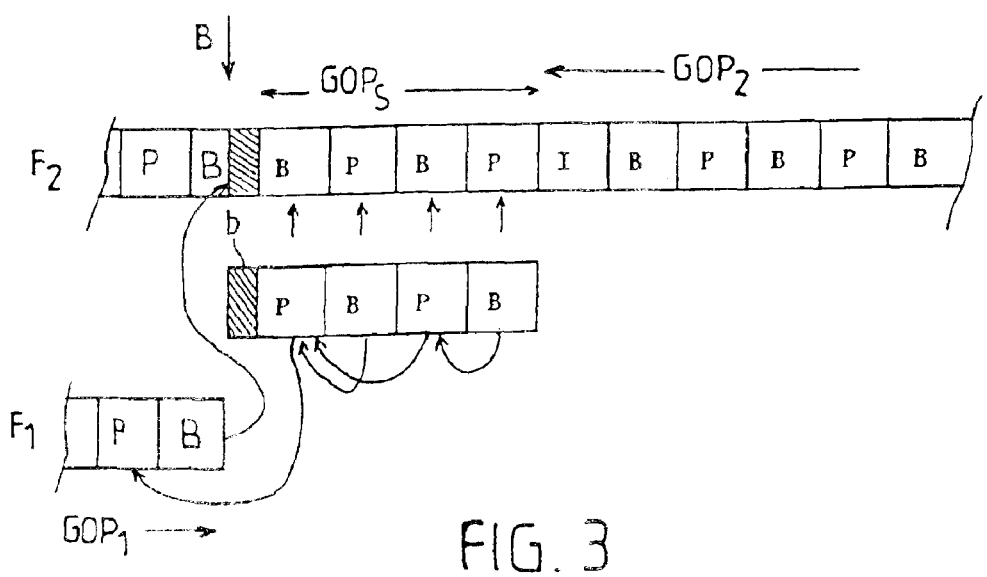
Figure 4:
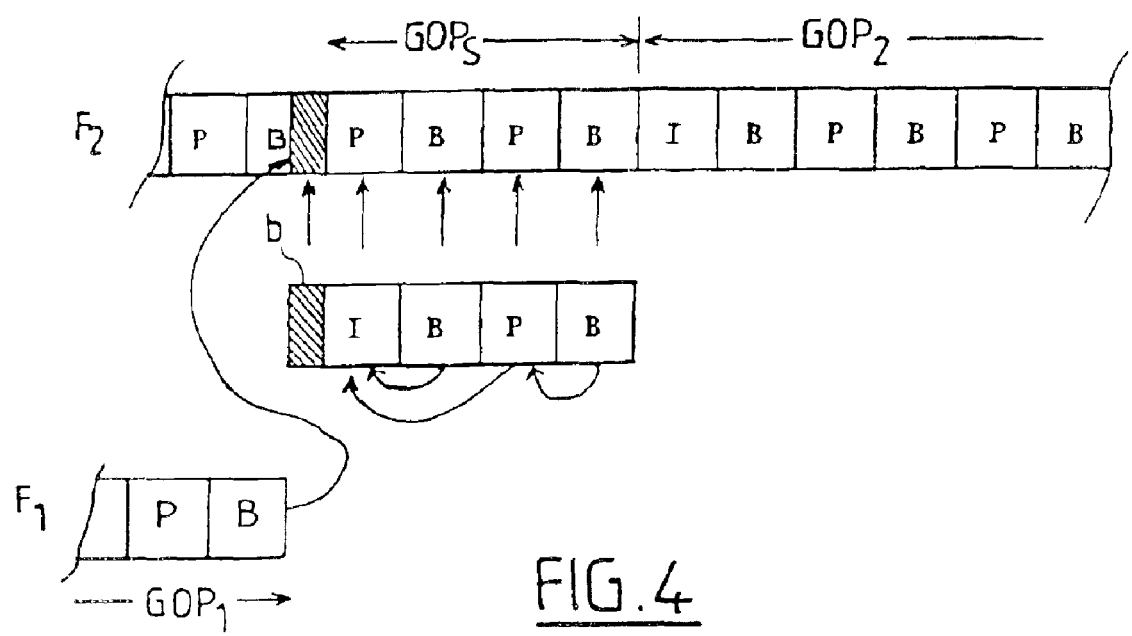
Figure 5:
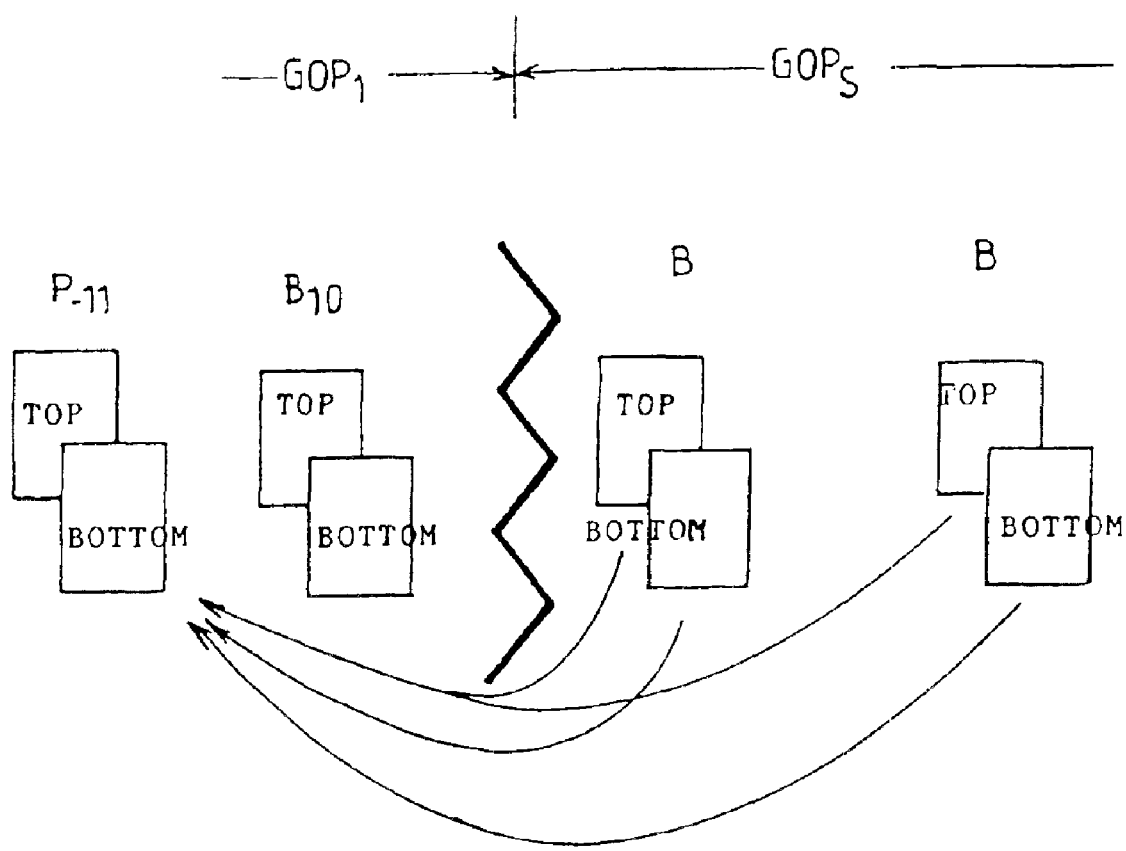
Figure 6:
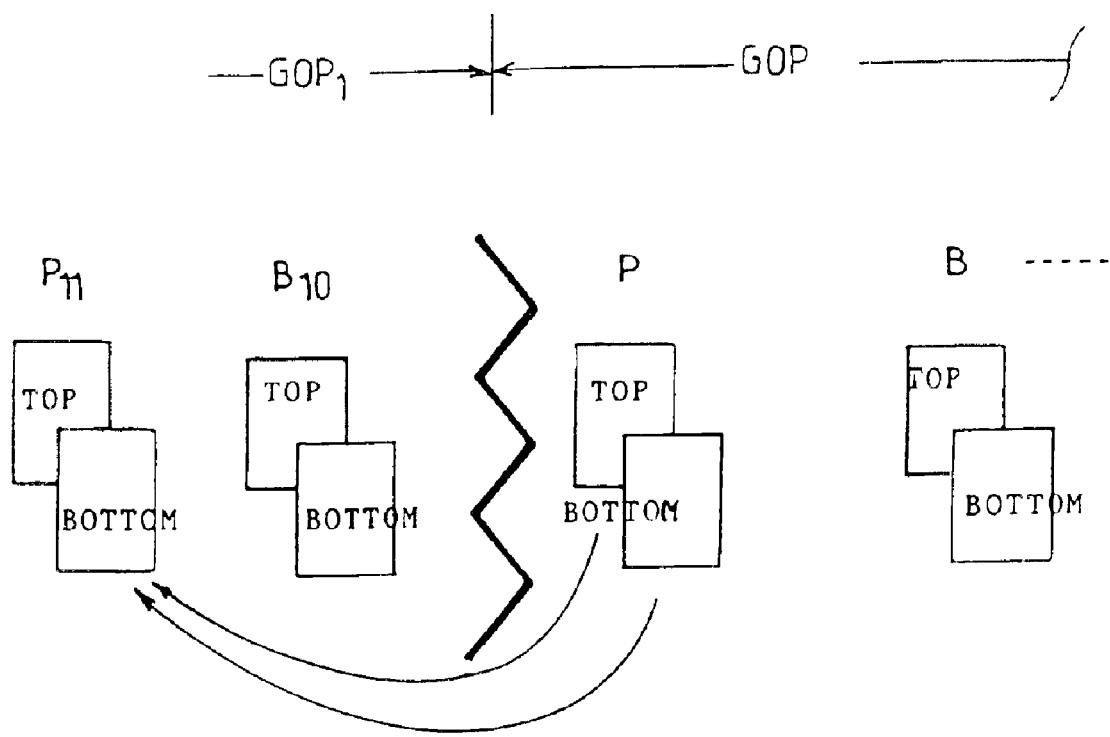
Figure 7:
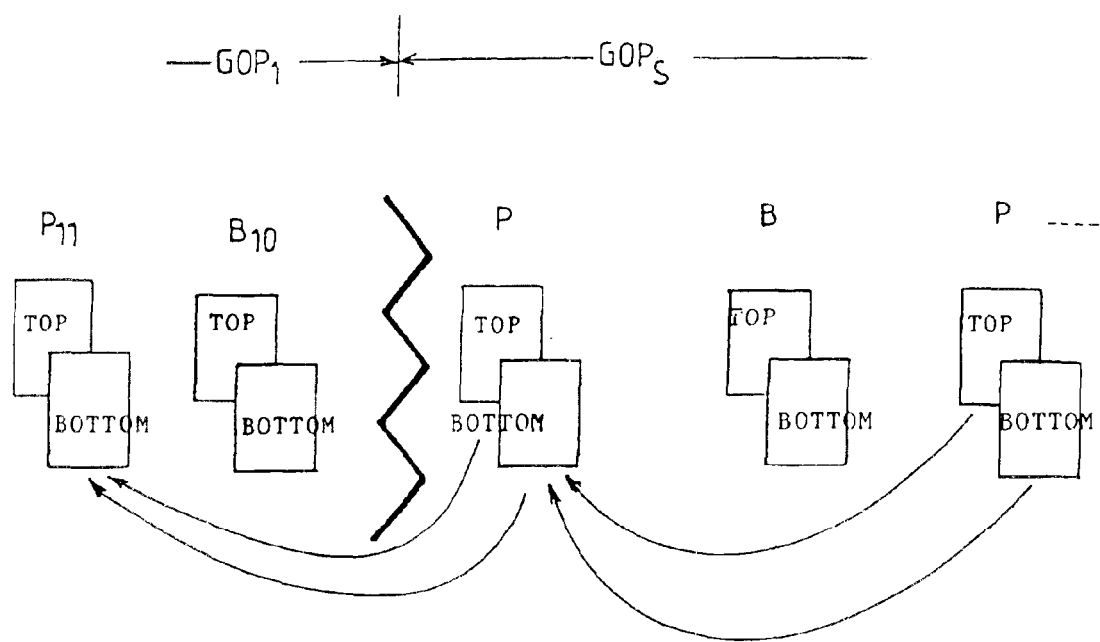
Figure 8:
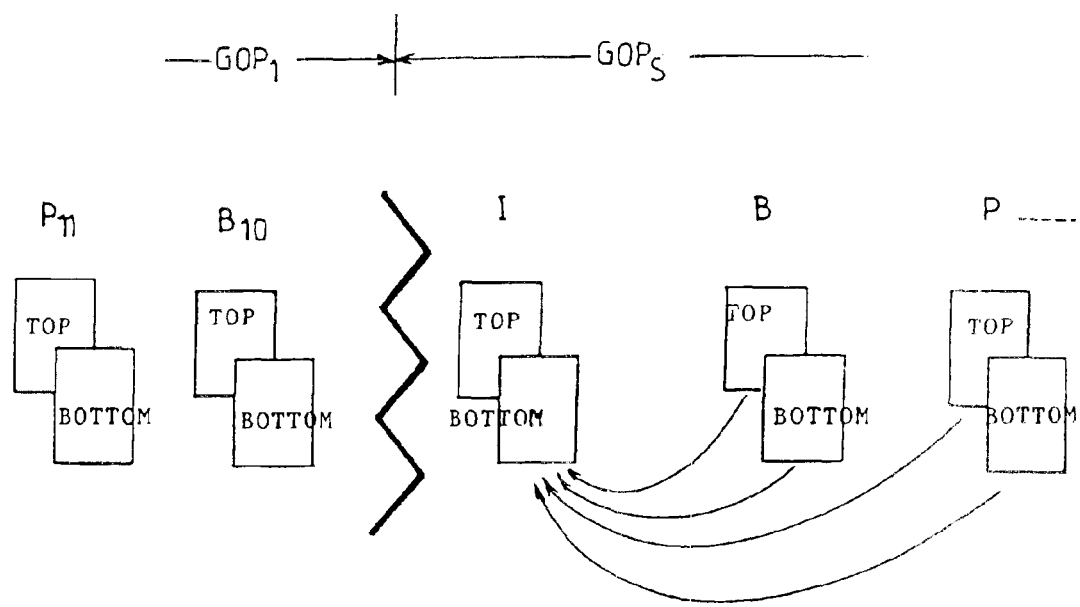
Figure 9:
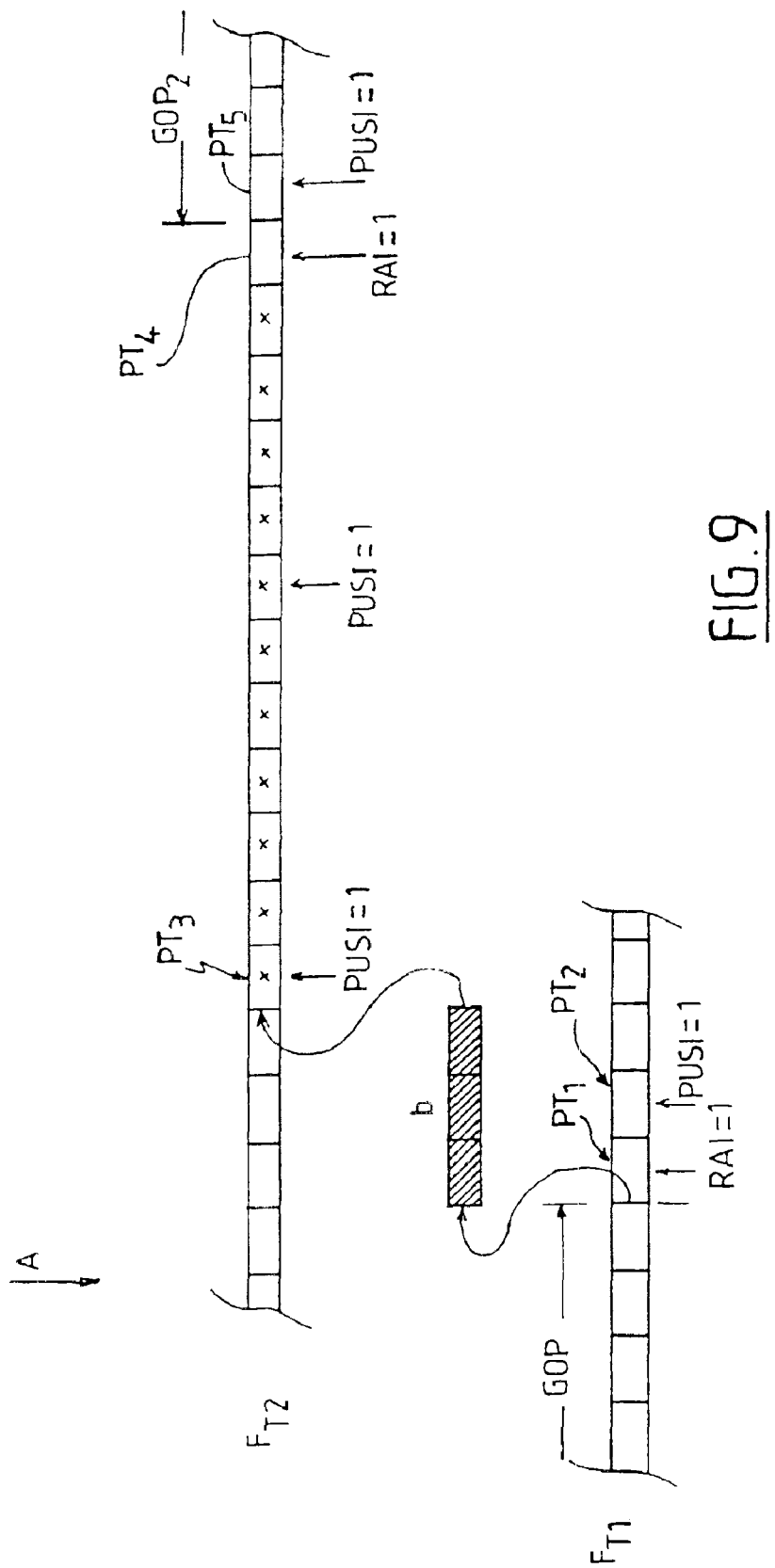

FIG. 1 is a view illustrating a switching method of a first implementing mode of the invention, FIG. 2 illustrates a switching procedure of a second implementing mode of the invention, FIG. 3 illustrates a switching procedure of a third implementing mode of the invention, FIG. 4 illustrates a switching procedure of a fourth implementing mode of the invention, FIG. 5 illustrates a switching procedure of the first implementing mode of FIG. 1 wherein the pictures comprise a top and a bottom frame, FIG. 6 illustrates a switching procedure of the second implementing mode of FIG. 3 wherein the pictures comprise a top and a bottom frame, FIG. 7 illustrates a switching procedure of the implementing mode of FIG. 3 wherein the pictures comprise a top and a bottom frame, FIG. 8 illustrates a switching procedure of the implementing mode of FIG. 4 wherein the pictures comprise a top and a bottom frame, FIG. 9 illustrates a switching procedure of the invention in the transport mode, and FIGS. 10a–10c illustrate the insertions of a transport packet fitted with an RAI indicator set at 1.

In the illustrative implementation now being described, the structure of the groups of pictures GOP of the two video streams under consideration and generally characterized by a gap between two P pictures (the M parameter in the MPEG-2 standard) and by a gap between two I pictures (called the N parameter in the MPEG-2 standard) is such that the parameter when being 2 denotes a single bidirectional picture B being placed between two consecutive predictive pictures P. As regards the N parameter, its value is arbitrary, the number of pictures in a group of pictures GOP being immaterial in the invention.

It must be borne in mind that each program may comprise several video components, for instance components which correspond to different fields of view of the program (several cameras for instance). The invention applies to each component, but for the sake of simplicity, herebelow, the description shall relate to a single video component for each program.

FIG. 1 shows an elementary video stream F1 of a first program and an elementary video stream F2 of a second program. Each stream F1, F2 consists of a sequence of groups of pictures GOP comprising Intra I pictures, bidirectional B pictures and predictive P pictures. These pictures are shown in the order of their transmissions.

FIG. 1 shows that the PES packets and the transport packets are absent from the implementation.

The switch command is shown by the arrow A and occurs during the group of pictures GOP1. This group of pictures GOP1 is the last transmitted group of pictures of the first-program video component.

In one illustrative mode of implementation of the invention, the group of pictures GOP1 must end before switching the video component of the stream F1 onto the video component of the stream F2. This switching is indicated by an arrow B in FIG. 1. In this Figure, the group of pictures GOP2 is the first group of pictures of the second-program video component that shall be transmitted after switching.

According to the invention, switching onto the second-program video component takes place at the above defined time (arrow B) and then each picture of this component is replaced by a picture of which the coding is implemented independently of the picture data of the replaced picture and of the contents of its related pictures until the beginning of the next group of pictures of said second program component. These replacements take place for each picture of the incomplete group GOPs. They are denoted by the vertical arrows between the replacement pictures and the replaced pictures.

In FIG. 1, the switching onto the second-program video component takes place after the last picture of the group of pictures of the first component video component which was transmitted after the switch command. The data present in the second-program video component between the end of the group of pictures GOP1 and the beginning of the first picture are replaced by stuffing data (denoted b in FIG. 1). Depending on the case, these stuffing data may be those in the video syntax, those in the PES packet syntax or those in the transport syntax.

Illustratively and according to an implementation mode of the MPEG-2 transport standard, those will be stuffing transport packets. The replacement pictures of the incomplete group of pictures GOP of the second program are denoted group of pictures GOPs. As shown by FIG. 1, the group of pictures GOPs consists of a sequence of bidirectional B pictures all referring to the last P (or I) type picture of the last group of pictures GOP1 of the first program (in FIG. 1, arrows represent this reference). These are forward references in the order of presentation. Moreover, the motion estimating vectors of each of the replacement pictures B are set to a zero value, making it possible to freeze the last P or I picture of the first program.

In FIG. 2, the replacement group GOPs consists of a picture P followed by a sequence of B pictures, where these bidirectional B pictures refer to said picture P. As regards the predictive P picture of the group GOPs, it refers to last P (or I) picture of the last group of pictures GOP1 of the first-program video component (forward reference in the order of presentation). Also, the motion estimating vectors of each of the predictive P pictures or bidirectional replacement pictures B are set to a zero value, making it possible to freeze the last P or I picture of the first program.

In this second implementing mode, the presence of the replacement picture P allows avoiding an unpleasant effect otherwise taking place at the end of replacement where interleaved pictures are concerned.

In FIG. 3 the replacement group GOPs consists of a sequence of alternating P or B pictures. The first replacement picture P relates to the last P or I picture of the last group of pictures GOP1 of the first-program video component. Each ensuing replacement picture P refers to the P picture which precedes it. Each replacement picture B refers to the P picture immediately preceding it. Therefore each P or B picture refers forward in the order of presentation. Also the motion estimating vectors of each of the replacement pictures P or B are set to a zero value, making it possible to freeze the last P or I picture of the first program.

In FIG. 4, the replaced group GOPs consists of a sequence of pictures of which the first is an I picture, the second a B picture, the third a P picture, the fourth a B picture, etc. The first replacement P picture refers to the replacement picture I. Each following replacement picture P refers to the replacement picture P which precedes it. Each replacement picture B refers to the replacement picture P immediately preceding it. Each P or B picture therefore constitutes a forward reference in the order of presentation. Furthermore the motion estimating vectors of each replacement picture P or B are set to a zero value, making it possible to freeze the replacement I picture.

This fourth implementing mode allows inserting advertizing spots framed by fixed pictures, for instance colored pictures or logos.

The present invention also applies to systems supporting interleaved pictures. This is the case for the systems under the MPEG-2 standard. In such systems, each picture comprises two frames, a TOP frame and a BOTTOM frame. The prediction of the macroblocks of these two frames may be frame-based or field-based. For perfect control and in order to avert "going backward", the prediction must be field based for each frame.

In the implementing mode shown in FIG. 5 and corresponding to the implementation of FIG. 1, the BOTTOM and TOP frames of each replacement bidirectional B picture refer to a single frame of the predictive P picture of the first program group of pictures GOP1. In FIG. 1, this frame is the BOTTOM frame. However it may also be the TOP frame.

Accordingly the frame of the P picture of the group of pictures GOP1 of the first program is maintained by the two BOTTOM and TOP frames of the replacement B pictures of the group of pictures GOPs. This implementation entails a drawback in the case of interleaved pictures: the P picture is displayed after the replacement pictures B as seen in the order of presentation. As a result, the impression of an advance is given at the end of the freeze because of the display of the BOTTOM frame of the P picture of the first program group of pictures GOP1. If the video is sluggish, this phenomenon will not be bothersome.

In the illustrative implementation of FIG. 6, corresponding to the implementation of FIG. 2, the two TOP and BOTTOM frames of the replacement picture P of the replacement group of pictures GOPs refer to a single frame of the picture P of the group of pictures GOP1 of the first program. Advantageously this frame shall be the BOTTOM frame. As regards the following picture B, its BOTTOM and TOP frames each refer to the BOTTOM frame of the P picture preceding it. The BOTTOM and TOP frames of each replacement picture B of the group of pictures GOPs maintain the BOTTOM frame of the substitution picture P.

This implementing mode allows attaining a perfect freeze from which any visual defect is excluded using interleaved pictures. However one drawback is the difficulty in updating the time reference of the replacement picture P.

In the implementing mode of FIG. 7 corresponding to the implementation of FIG. 3, the two TOP and BOTTOM frames of the first replacement picture P of the group of pictures GOPs refer to a single frame of the predictive picture P of the first program group of pictures GOP1. Advantageously this frame shall be the BOTTOM frame. The BOTTOM and TOP frames of each P picture and of each B picture of the replacement group of pictures GOPs refer to the single BOTTOM frame of the P picture which precedes it.

This implementing mode allows perfect freezing without any visual defects using interleaved pictures and updating the time reference entails no problems.

In the implementing mode of FIG. 8 corresponding to the implementation of FIG. 4, the TOP and BOTTOM frames of each P picture and of each B picture of the group of pictures GOPs refer to the single BOTTOM frame of the I or P picture which directly precedes it as seen in the order of transmission.

This mode of implementation allows perfect freezing without any visual defects with interleaved pictures and updating the time reference will not entail any problems.

The above cited references are carried out by setting the particular indicators in the macroblocks of the particular replacement pictures. All replacement picture macroblocks are coded to avert default-referencing the frames on the frame of the same parity (TOP on TOP and BOTTOM on BOTTOM) and dissociating each one's prediction.

Furthermore the picture patterns of the replacement group of pictures GOPs all must exhibit the same characteristics (resolution, or horizontal a vertical sizes in particular) as the pictures they replace. A number of means are available to retrieve the size information: it may be retrieved from the target background grid descriptor (if any) in the program map table, and it may be retrieved directly from the data of the video elementary stream etc.

Also, the time reference (order of the pictures to be displayed) of each replacement picture must be updated.

Lastly and to follow the standard, the VbV delay which is the least wait before it is possible to code a picture once the first picture octet has reached the decoder's buffer memory, is defined as follows:
  if said delay is situated in the other pictures of the group of pictures GOP2, it also must be situated the pictures of the replacement group: it may be retrieved from the replaced picture,
  if the delay is at 'FFFF in the other pictures of the group of pictures GOP2, it must also be set at 'FFFF in the pictures of the replacement group.

As cited above, according to the MPEG-2 standard, the elementary stream packets PES comprise a header h and a payload with the data of a portion of one picture, of one picture or of several pictures (in general one picture) and are cut into transport packets TP. In case the payload of a PES packet contains the data of a single picture, the PES packets are aligned and the corresponding data alignment indicator is set at 1.

Again according to the MPEG-2 standard, the transport packets of which the payload begins with the header h of a PES packet contain in their actual header H a specialized PUSI (payload unit start) indicator: this PUSI indicator is set at 1. Therefore transport packets of which the PUSI indicator is set at 1 contain the first data relating to a particular picture (this also is the case for the TP2, TP3 and TP5 packets of FIG. 9).

Other transport packets intended to carry transport information contain an adaptation field AF. In this adaptation field AF, a random access indicator RAI indicates, when set at 1 (for example in the transport packet TP1 or the packet TP4 of FIG. 9), that the next transport packet of which the PUSI indicator is set at 1 (resp. here the transport packet TP2 and the packet TP5), contains not only a beginning of a PES packet but also a beginning of a video sequence in the PES packet.

Be it noted that the transport packet TP of which the PUSI indicator is set at 1 may be the one of which the random access indicator RAI also is set at 1.

The adaptation field furthermore contains a discontinuity indicator DI which, when set at 1, indicates discontinuity starting with the transport packet TP, namely discontinuity of the continuity counter or discontinuity of the PCR clock reference if the component carries the PCR clock references.

Therefore two streams of transport packets are available in the invention (FIG. 9). The first transport stream Ft1 relates to the transport packets of the first program and the second transport stream Ft2 relates to the transport packets of the second program.

FIG. 9 only shows those packets which move the video components of the programs under consideration. The transport packets of which the packet indicator PID differs and which are typically interposed were deliberately omitted for the sake of clarity.

Switching one video program onto another in the transport mode mainly consists in replacing the transport packets TP of the first-program video component with the transport packets TP of the second-program video component, if necessary accompanied by re-stamping.

Following the switch command (denoted by the arrow A in FIG. 9), the end of the sequence (of the group of pictures GOP1) in the first program must be awaited. The next transport packet in the transport stream Ft1 of the first program of which the random access indicator RAI is set at 1 (in this instance the transport packet TP1), will determine the time of switching onto the second program.

From that time on, the transport packets TP of the first-program video component are replaced with stuffing transport packets TP (denoted "b" in FIG. 9) until the appearance of the PUSI indicator of a transport packet TP of the transport stream Ft2 of the second program be set at 1. When such a packet denoting an image beginning in the stream Ft2 presents itself (in this example the TP3 packet), replacement may begin. This replacement will continue until the appearance of a packet, in this case TP4, shall appear in the transport stream Ft2, the header of said packet containing an RAI indicator be set at 1 denoting a beginning of sequence (in this case a group of pictures GOP2).

The procedure replacing a picture of the transport stream Ft2 of the second program with a replacement picture is as follows:
  the PES packet header situated at the beginning of the payload is replaced in the transport packet TP of which the PUSI indicator is set at 1 with a header of a reconstructed PES packet; in an advantageous embodiment mode, the various fields of this header assume the following values: start code=0x000001, flux stream indicator=that of the first program, PES packet length= 0x0000, 2 flag octets=0x8500, header data length= 0x00, PES packets in clear, no PTS/DTS stamps nor any other data of PES packet header, beginning with this transport packet (after the PES packet header), the data of the payload of each transport packet of this component shall be replaced by the data of replacement picture (Intra picture I, bidirectional picture B or predictive picture P depending on the replacement mode selected from the above described mode and on the replaced picture). If the transport packets TP are scrambled, they shall be denoted in clear by setting the control field of the transport scrambling control TSC at the binary value 00; note should be taken that the access control messages ECM (rights control messages) containing the cryptograms of the control words continue being emitted, when all replacement picture data have been inserted into the payloads of the video component transport packet TP, replacement continues by replacing the payload data with video stuffing (namely '00 octets) until the appearance of the next transport packet of this second-program video component of which the PUSI indicator is set at 1 (this transport packet TP excluded), then restarting the three preceding stages from this new transport packet TP with the PUSI indicator set at 1 until the appearance of the next transport packet TP of the second-program video component of which the RAI indicator is set at 1 (excluded), setting the discontinuity indicator DI at 1 on this packet fitted with the RAI indicator, corresponding to the end of replacement and to the effective beginning of the second program video.

In case the RAI indicators are absent from one or both transport streams, a method of the invention allows finding the sequence headers in the payloads of the transport packets TP at the time of switching. This method consists in determining during a first time interval the transport packet TP of the video component of the stream(s) lacking an RAI indicator of which PUSI indicator is set at 1 and of which the payload data begin with a video sequence header.

If the video component is in clear, the search for the sequence header does not raise problems: if present, it will be situated directly after the PES packet header. If the video component is scrambled, the search for the sequence header entails using an unscrambler.

If the transport packet TP so determined comprises an adaptation field with a program clock reference PCR in the case when the component carries the program clock, it will be feasible to easily set the discontinuity index DI in this transport packet TP.

If said transport packet TP lacks an adaptation field AF or if it comprises one but lacks a clock reference PCR when the component carrying the program clock is involved, then a transport packet TP must be inserted in order to locate the discontinuity indicator DI, and, as called for, the clock reference PCR.

This case is shown in FIG. 10a. The upper line shows a transport packet TP1 of which the header H is fitted with the PUSI indicator set at 1 and of which the payload PL contains a sequence header but lacks an adaptation field AF. In this example, the packet identifier PID equals 100 and the discontinuity counter COMP equals an arbitrary value of 5.

The inserted transport packet TPins exhibits the following features (lower line of FIG. 10a):

the PUSI indicator is set at 0: this indicates that this transport packet TP lacks the beginning of a PES packet, the status of the continuity counter is set at that of the initial transport packet's (TP's) continuity counter, less 1 (here: 5−1=4)

the control field AFC of the adaptation field AF is set at the binary value 10 denoting the presence of an adaptation field in this transport packet TP, but no payload, the discontinuity indicator DI situated in the adaptation field AF is set at 1.

if the video component carries the program clock, a program clock reference PCR calculated after the PCR clock references preceding the same component is moved into the adaptation field AF.

The transport packet TP replaced by TP1 which is neither suppressed nor modified. It is phase-shifted, and so are the following transport packets TP of this video component in the transport stream until one of them can be inserted into a stuffing transport packet TP.

In case the RAI indicators are absent from one or both transport streams but are used in implementing switching, the invention also provides pre-processing to make it possible to insert them several seconds before re-connection.

As stated above in relation to the MPEG-2 system standard, the RAI indicator is situated the adaptation field AF. Set at 1, it denotes that the next transport packet TP of this component which contains a PES packet beginning (and hence a PUSI indicator set at 1) will comprise a sequence header in its payload. Also, all synchronization data must be present in the transport packet TP of which the RAI indicator is set at 1, in particular a PCR clock reference if the component carries the program clock and the presentation time stamp PTS in the PES packet header.

In case a presentation stamp PTS is present in the header of the PES packet containing the sequence header, the transport packet TP inserted to set the RAI indicator exhibits the same characteristics as before, but the RAI indicator situated in the adaptation field AF is set at 1. The replaced transport packet TP is unmodified but shifted, as are the following transport packets TP of this video component, in the transport stream until one of them can be inserted into a stuffing transport packet TP.

This case is illustrated in FIG. 10b.

FIG. 10c shows the case when the presentation stamp PTS is absent from the header of the PES packet which contains the sequence header. The transport packet TP which is inserted to set the RAI indicator, namely TPins, exhibits the following features:

the PUSI indicator is set at 1: this denotes that the PES packet header is located in the payload, the status of the continuity counter COMP is set at that of the continuity counter of the initial transport packet TP less 1 (5−1=4, the field control AFC of the adaptation field AF is set at the binary value 11, denoting that an adaptation field and a payload are present in this packet, the adaptation field AF comprises an RAI indicator set at 1, the discontinuity indicator DI is set at 1, if the video component carries the program clock, a program clock reference PCR is situated in the adaptation field and is calculated based on the preceding PCR reference(s) of the same component, a presentation stamp PTS is calculated and situated in this packet's payload, the PES packet header which was situated in the replaced transport packet TP is displaced in the payload of this inserted transport packet TP and if the presentation stamp PTS is absent from the PES packet header, this PTS stamp shall be calculated and situated into the header data of this PES packet.

The replaced transport packet TP therefore is modified in a manner that its PUSI indicator shall be set at 1 and in that it lacks the PTS packet header. This transport packet TP is shifted in the transport stream, and so are the following transport packets TP of this video component, until one of them can be inserted into a stuffing transport packet.

It should be borne in mind that this last solution can hardly be considered for the case of the second program being scrambled unless rigorous operating rules be adopted: in case the second program were to share the entitlement control messages ECM linked to scrambling these components with other programs, said ECM messages would require a particular processing procedure (for instance being recreated) in order not to delay the other programs.

What is claimed is:

1. A method of switching video component(s) of a first digital audio-visual program onto video component(s) of a second digital audio-visual program, each video component including, in the order of presentation, an ordered sequence of pictures which are either Intra pictures (denoted by I) or predictive pictures (denoted by P) or bidirectional pictures (denoted by B), each Intra picture referring to no other picture, each predictive picture referring to the Intra picture or to the predictive picture preceding it, each bidirectional picture being able to refer to two non-bidirectional pictures Intra or P, either to the Intra picture or to the predictive picture preceding it or to the Intra picture or the P picture following it, or to a combination of the two preceding or following Intra or predictive pictures, the method comprising (a) switching at a switching time following the end of a picture of the first program after the switch command onto the picture of the video component of the second program which is present at said time, and (b) replacing, as seen in the order of transmission, each picture other than Intra of said second program component, where said latter picture is situated between the switching time and the beginning of the next Intra picture of said second program component, with a picture having the coding thereof being carried out independently of the picture data of the replaced picture and of the contents of the pictures to which the replacement picture refers, the replacement pictures being included in a sequence of pictures which includes, as seen in the direction of transmission, alternating predictive and bidirectional pictures, the first predictive replacement picture P referring to the last predictive picture P or Intra picture I of the first-program video component, then each following predictive replacement picture P referring to the predictive picture P which precedes it, and each bidirectional replacement picture B referring only to the predictive picture P which precedes it, the number of bidirectional pictures B between two predictive pictures P being equal to that encountered in the first-program video component, and the motion estimating vectors of each replacement picture being set to a zero value.

2. The method of claim 1, further including replacing (a) the information present in the second-program video component between the time at which the end of a picture of the first-program video component has been encountered after having received the switch command and the beginning of the first picture of the second program with (b) stuffing data. after having received the switch command and the beginning of the first picture of the second program with (b) stuffing data.

3. The method of claim 1, further including updating the time references of each replacement picture.

4. The method of claim 1, further including retrieving the information relating to the minimum delay Vbv before it is possible to decode a picture from the replaced picture and moving the information relating to the minimum delay Vbv before it is possible to decode a picture from the replaced picture into each corresponding substitution picture unless it be equal to 'FFFF in the other pictures of said second program component, in which latter case it assumes the value 'FFFF.

5. The method of claim 1, wherein the replacement pictures are included in a sequence of bidirectional B pictures all referring to the last predictive P picture of the first-program video component, and further including resetting to a zero value the motion estimating vectors of each of the bidirectional replacement pictures.

6. The method of claim 5, wherein said replacement B pictures are interleaved pictures comprising a BOTTOM field and a TOP field which thereby are similar to and the BOTTOM fields of said B replacement pictures referring to the single BOTTOM field of the last predictive picture P of the first-program video component.

7. The method as of claim 1, wherein the replacement pictures are included in a sequence of pictures which as seen in the direction of transmission includes a predictive picture followed by one or more bidirectional pictures, the predictive replacement picture P referring to the last predictive picture P of the first-program video component and each of the bidirectional pictures B referring to said replacement picture P, and setting to a zero value the motion estimating vectors of each of the replacement pictures.

8. The method of claim 7, wherein said replacement pictures are frame pictures comprising a TOP field and a BOTTOM field which thereby are similar to a digital television picture and their predictions are field-based predictions, the TOP and BOTTOM fields of the first predictive replacement picture P referring to the single BOTTOM field of the last predictive picture P or I of the first-program video component and the TOP and BOTTOM fields of the following bidirectional B or predictive P pictures referring to the BOTTOM field of the first predictive replacement picture P.

9. A method of switching video component(s) of a first digital audio-visual program onto video component(s) of a second digital audio-visual program, each video component including, in the order of presentation, an ordered sequence of pictures which are either Intra pictures (denoted by I) or predictive pictures (denoted by P) or bidirectional pictures (denoted by B), each Intra picture referring to no other picture, each predictive picture referring to the Intra picture or to the predictive picture preceding it, each bidirectional picture being able to refer to two non-bidirectional pictures Intra or P, either to the Intra picture or to the predictive picture preceding it or to the Intra picture or the P picture following it, or to a combination of the two preceding or following Intra or predictive pictures, the method comprising (a) switching at a switching time following the end of a picture of the first program after the switch command onto the picture of the video component of the second program which is present at said time, and (b) replacing, as seen in the order of transmission, each picture other than Intra of said second program component, where said latter picture is situated between the switching time and the beginning of the next Intra picture of said second program component, with a picture having the coding thereof being carried out independently of the picture data of the replaced picture and of the contents of the pictures to which the replacement picture refers, the replacement pictures including in a sequence of pictures which includes as seen in the order of transmission of a first picture which is an Intra picture, the other pictures being an alternation of bidirectional and predictive pictures, the first predictive replacement picture P referring to the Intra picture, then each following predictive replacement picture P referring to the predictive picture P which precedes it, and each bidirectional replacement picture B only referring to the predictive picture P or the Intra picture I which precedes it, the number of bidirectional pictures B between two predictive pictures P being equal to that encountered in the first-program video component and setting to a zero value the motion estimating vectors of each replacement picture except for the Intra picture which lacks motion estimating vectors.

10. The method of claim 9, wherein said replacement pictures are frame pictures comprising a TOP field and a BOTTOM field which thereby are pictures similar to those of digital television, and the predictions of the bidirectional pictures B and the predictive pictures P being field-based predictions, the TOP and the BOTTOM fields of the P or B replacement pictures which follow the picture I referring to the BOTTOM field of the I or P replacement picture which precedes it.

11. A method of switching video component(s) of a first digital audio-visual program onto video component(s) of a second digital audio-visual program, each video component including, in the order of presentation, an ordered sequence of pictures which are either Intra pictures (denoted by I) or predictive pictures (denoted by P) or bidirectional pictures (denoted by B), each Intra picture referring to no other picture, each predictive picture referring to the Intra picture or to the predictive picture preceding it, each bidirectional picture being able to refer to two non-bidirectional pictures Intra or P, either to the Intra picture or to the predictive picture preceding it or to the Intra picture or the P picture following it, or to a combination of the two preceding or following Intra or predictive pictures, the method comprising (a) switching at a switching time following the end of a picture of the first program after the switch command onto the picture of the video component of the second program which is present at said time, and (b) replacing, as seen in the order of transmission, each picture other than Intra of said second program component, where said latter picture is situated between the switching time and the beginning of the next Intra picture of said second program component, with a picture having the coding thereof being carried out independently of the picture data of the replaced picture and of the contents of the pictures to which the replacement picture refers, the replacement pictures being included in a sequence of bidirectional B pictures all referring to the last predictive P picture of the first-program video component, and further including resetting to a zero value the motion estimating vectors of each of the bidirectional replacement pictures, the method being performed with a transmission system for transporting said pictures by transport packet streams, each transport packet stream including video components of the first and second programs, each transport packet TP including a payload unit start PUSI indicator which, when set at 1, indicates that said packet includes the beginning of a packetized elementary stream PES packet, the PES packets being aligned with the beginning payloads of the transport packets TP, each PES packet containing only one picture, certain transport packets in said transmission system being arranged to carry a random access transport indicator RAI which, when set at 1, denotes that the next transport packet moving this component contains the first data of a video sequence, the method further comprising:

determining the first transport packet TP of the first-program video component after the switch command, said packet comprising a random access indicator RAI set at 1 in order to determine the time of switching onto the second program;

switching onto said second-program video component and replacing the transport packets TP of this video component with stuffing transport packets until the appearance of the following transport packet TP of which the PUSI indicator is set at 1;

within this transport packet TP of which the PUSI indicator is set at 1 and if the RAI indicator is not set, replacing the PES packet header situated at the beginning of the payload with a reconstructed PES packet header;

starting with this transport packet and after the PES packet header, replacing the payload data of each transport packet of this component with the replacement picture data;

when all replacement picture data have been inserted into the payload of the video component transport packets TP, replacing the payload data of the following transport packets TP of the component with video stuffing until the appearance of the next transport packet of this second-program video component of which the PUSI indicator is set at 1, this transport packet TP excluded;

then restarting the preceding stage from this transport packet TP with the PUSI indicator set at 1 until the appearance of the next transport packet TP of the second-program video component of which the random access indicator RAI is set at 1, this transport packet excluded; and setting the discontinuity indicator DI at 1 on this packet with random access indicator RAI which corresponds to the end of replacement and to the effective beginning of the second program video.

12. The method of claim 11, further including denoting scrambled transport packets TP in clear while setting the control field of transport scrambling control TSC at the binary value 00.

13. The method of claim 11, wherein if one or both video components are devoid of a random access indicator RAI set in the transport stream, the following steps are performed:

determining the transport packet TP of the video component of the stream(s) without RAI indicator of which the PUSI indicator is set at 1 and of which the payload data begin with a video sequence header;

searching for the sequence header following the switch command; and setting the discontinuity index in the determined transport packet TP if the latter comprises an adaptation field AF with a program clock reference PCR when the component carries the program clock; or if the determined transport packet TP does not include an adaptation field AF or if the program clock carrying component is involved and the adaptation field AF lacks a clock reference PCR, replacing the determined transport packet TP with a specific transport packet TP called the inserted transport packet, and shifting the replaced transport packet TP as well as the following transport packets TP of this video component in the transport stream until one of them can be inserted into a stuffing transport packet TP.

14. The method of claim 13, wherein the inserted transport packet includes the following characteristics:

the PUSI indicator is set at 0;

the status of the continuity counter COMP is set at that of the continuity counter of the initial transport packet TP less 1;

the control field AFC of the adaptation field AF is set at the binary value 10, denoting the presence of an adaptation field AF in the initial transport packet TP, but no payload;

the discontinuity indicator DI situated in the adaptation field AF is set at 1; and if the video component carries the program clock, a program clock reference PCR calculated on the basis of the preceding clock reference(s) PCR of the same component is set into the adaptation field.

15. The method of claim 13, wherein if a presentation stamp PTS is present in the header of the PES packet including the sequence header, the method further includes pre-processing the setting of the random access indicator RAI, said transport packet TP being inserted to set the random access indicator RAI to then include the following characteristics:

the PUSI indicator is set at 0;

the status of the continuity counter COMP is set at that of the continuity counter of the initial transport packet TP, less 1;

the control field AFC of the adaptation field AF is set at the binary value 10 denoting that an adaptation field AF is present in the initial transport packet TP but no payload;

the RAI indicator situated in the adaptation field AF is set at 1;

the discontinuity indicator DI situated in the adaptation field is set; and if the video component carries a program clock, a program clock reference PCR calculated on the basis of the preceding clock reference(s) PCR of the same component is moved into the adaptation field AF.

16. The method of claim 13, wherein if a presentation stamp is absent from the header of the PES packet containing the sequence header, the method further includes pre-processing the setting of the RAI indicator, and modifying the initial transport packet TP in such a way that the PUSI indicator is set at 0, and the useful data are eliminated from the PES packet header, said transport packet TP being inserted to set the RAI indicator to then include the following features:

the PUSI indicator is set at 1;

the status of the continuity counter COMP is set at that of the continuity counter of the transport packet TP less 1;

the control field AFC of the adaptation field AF is set at the binary value 11 to denote that an adaptation field AF and a payload are present in this transport packet;

the adaptation field AF comprises an RAI indicator set at 1;

the discontinuity is set at 1 on this packet with RAI indicator;

a program clock reference PCR calculated on the basis of the preceding clock reference(s) is set in the adaptation field AF if the video component carries the program clock;

a presentation stamp PTS is calculated and moved into the payload of this packet; and the PES packet header which was in the replaced transport packet TP is shifted into the payload of this inserted transport packet TP and in case of the absence of the presentation stamp PTS from the PES packet header, this PTS stamp shall be calculated and set in the header data of this PES packet.

17. A method of switching video component(s) of a first digital audio-visual program onto video component(s) of a second digital audio-visual program, each video component including, in the order of presentation, an ordered sequence of pictures which are either Intra pictures (denoted by I) or predictive pictures (denoted by P) or bidirectional pictures (denoted by B), each Intra picture referring to no other picture, each predictive picture referring to the Intra picture or to the predictive picture preceding it, each bidirectional picture being able to refer to two non-bidirectional pictures Intra or P, either to the Intra picture or to the predictive picture preceding it or to the Intra picture or the P picture following it, or to a combination of the two preceding or following Intra or predictive pictures, the method comprising (a) switching at a switching time following the end of a picture of the first program after the switch command onto the picture of the video component of the second program which is present at said time, and (b) replacing, as seen in the order of transmission, each picture other than Intra of said second program component, where said latter picture is situated between the switching time and the beginning of the next Intra picture of said second program component, with a picture having the coding thereof being carried out independently of the picture data of the replaced picture and of the contents of the pictures to which the replacement picture refers, the method being performed with a transmission system for importing said pictures by transport packet streams, each transport packet stream including the video components of the first and second programs, each transport packet TP comprising a payload unit start indicator PUSI which, when set at 1, indicates that said packet includes the beginning of packetized elementary stream PES packet, the PES packets being aligned with the beginning of the transport packet TP payloads, each PES packet containing only one picture, said transmission system being such that certain transport packets are arranged to carry a random access transport indicator RAI which, when set at 1, indicates that the next transport packet moving this component contains the first data of a video sequence, the method further comprising:

determining the first transport packet TP of the first-program video component present after the switch command and including a random access indicator RAI set at 1 in order to determine the time of switching onto the second program;

switching onto said second-program video component and replacing the transport packets TP of said video components with stuffing transport packets until the appearance of the following transport packet TP of which the PUSI indicator is set at 1;

if the RAI indicator Is set based on this transport packet and after the PES packet header, then replacing the payload data of each transport packet of this component with the replacement picture data, and when all the replacement picture data have been inserted in the payload of the video component transport packets TP, substituting the payload data of the following transport packets TP of the component with video stuffing until the appearance of the next transport packet of this second-program video component of which the PUSI indicator is set at 1, this transport packet TP being excluded;

then restarting the preceding stage on the basis of this transport packet TP with the PUSI indicator set at 1 until the appearance of the next transport packet TP of the second-program video component of which the random access indicator RAI is set at 1, this transport packet being excluded; and setting the discontinuity indicator DI at 1 on this packet with the random access indicator RAI, which corresponds to the end of replacement and to the effective beginning of the second program video.

* * * * *